(12) United States Patent
Takei et al.

(10) Patent No.: US 6,415,097 B1
(45) Date of Patent: *Jul. 2, 2002

(54) IMAGE REPRODUCING AND STORAGE ARRANGEMENT WITH STORED IMAGE INDEX INFORMATION

(75) Inventors: Masahiro Takei, Kawasaki; Seiichi Ozaki, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/366,439

(22) Filed: Dec. 30, 1994

Related U.S. Application Data (63) Continuation of application No. 08/029,058, filed on Mar. 10, 1993, now abandoned.

(30) Foreign Application Priority Data

Mar. 11, 1992 (JP) .............................. 4-052276

(51) Int. Cl.$^7$ ................................................. H04N 5/91
(52) U.S. Cl. ........................................... 386/69; 386/83
(58) Field of Search .............................. 360/35.1, 33.1, 360/10.1, 11.1, 27; 386/121, 69, 48.83, 68, 110, 95; 358/906; H04N 5/91

(56) References Cited

U.S. PATENT DOCUMENTS

| | | | | |
|---|---|---|---|---|
| 4,302,776 A | * | 11/1981 | Taylor et al. ......... 360/33.1 X |
| 4,641,203 A | * | 2/1987 | Miller ..................... 358/335 |
| 4,805,039 A | * | 2/1989 | Otake et al. ............. 358/335 |
| 4,914,526 A | | 4/1990 | Sakata et al. .............. 360/8 |
| 4,982,291 A | * | 1/1991 | Kurahashi et al. ....... 358/906 |
| 4,996,664 A | | 2/1991 | Fujiwara et al. ......... 364/900 |
| 5,023,730 A | | 6/1991 | Sakata et al. ............ 360/48 |
| 5,027,230 A | * | 6/1991 | Nakayama .............. 360/35.1 |
| 5,157,511 A | * | 10/1992 | Kawai et al. ........... 360/10.1 |
| 5,359,712 A | * | 10/1994 | Cohen et al. ............ 395/161 |
| 5,384,674 A | * | 1/1995 | Nishida et al. .......... 360/72.2 |
| 5,440,401 A | * | 8/1995 | Parulski et al. .......... 358/342 |
| 5,479,266 A | * | 12/1995 | Young et al. ........... 358/335 |
| 5,761,369 A | * | 6/1998 | Yoshimura et al. ..... 386/68 X |

FOREIGN PATENT DOCUMENTS

| | | | |
|---|---|---|---|
| JP | 60172892 | * | 6/1985 |
| JP | 0444687 | * | 2/1992 |

* cited by examiner

*Primary Examiner*—Vincent Boccio
(74) *Attorney, Agent, or Firm*—Fitzpatrick, Cella, Harper & Scinto (57) ABSTRACT

An index image is immediately displayed. A recording and reproduction apparatus records images onto a video medium and reproduces the recorded images. A computer checks whether an index image of the video medium loaded in the recording and reproduction apparatus has been recorded on a hard disk or not. When the index image exists, it is displayed on a monitor. When no index image exists, an instruction to form the index image is instructed to the recording and reproduction apparatus and the formed index image is recorded on the hard disk. In this instance, an ID code to specify the medium is stored on the hard disk and is transferred to the recording and reproduction apparatus for the $H_1$ term of a video signal and is also recorded on the medium.

17 Claims, 10 Drawing Sheets

IMAGE REPRODUCING AND STORAGE ARRANGEMENT WITH STORED IMAGE INDEX INFORMATION

This application is a continuation of application Ser. No. 08/029,058 filed Mar. 10, 1993, now abandoned.

BACKGROUND OF THE INVENTION

1. Field of the Invention

The present invention relates to an image reproducing system and, more particularly, to an image reproducing system comprising an image reproducing apparatus and a control unit such as a computer or the like to externally control the image reproducing apparatus.

2. Related Background Art

As a system to easily record a still image, an electronic still camera has been known. In the electronic still camera, a photographed image is recorded in an analog or digital manner onto a recording medium of a small size and a relatively large capacity such as small magnetic disk, solid-state memory device (D-RAM, EEPROM, flash memory, or the like which is backed up by a battery), optical disc, magnetooptical disk, or the like. In general, the electronic still camera also has a reproducing function. By connecting a liquid crystal TV or the like to a video output terminal of the electronic still camera, the photographed image can be monitored on the spot. A desk top type reproducing apparatus has also been put into practical use.

A small magnetic disk as an early recording medium has a diameter of two inches and is called a still video floppy. Such a still video floppy has 50 tracks and is specified so as to record a video signal of one field to one track. It is troublesome to individually reproduce maximum 50 images recorded and to check the contents. Therefore, there has been proposed a technique such that a plurality of, for example, 9 (3×3), 16 (4×4), or 25 (5×5) images are reduced and displayed in a lump (multi-image) on one screen. Such a batch display image is hereinafter called an index screen or index image.

For this purpose, however, the index image is recorded onto the same still video floppy which has previously been formed or, when such an index image is not yet recorded, the recording image of each track is reproduced and reduced and stored into a field (or frame) memory, the recording images of the necessary number are stored into such a memory and an index image is formed, and after that, the image data is read out from the memory, and the index image is displayed onto the monitor screen. That is, there is a drawback such that in order to display the index image, the reproducing head is sequentially moved to each track of the still video floppy and the recording image of each track must be reproduced, so that it takes a long time to reproduce the recording images.

If the recording images are reproduced to form an index image each time the still video floppy is exchanged, the magnetic head will be soon abraded.

Such a problem is not limited to the above floppy but similarly occurs even in case of another medium such as optical disk or tape-shaped medium.

In recent years, an image processing technique on a computer has progressed and, for instance, there has been proposed an image processing system such that a reproducing apparatus of an image recording medium such as a still video floppy is controlled by a computer and the reproduced image is edited and processed by the computer.

Even in such systems, the above problem also occurs.

SUMMARY OF THE INVENTION

It is an object of the present invention to provide an image reproducing system which can totally or individually solve the above problems.

Another object of the invention is to provide an image reproducing system which can promptly execute a reproducing process.

Still another object of the invention is to provide an image processing system which can reduce a possibility of a damage of a medium.

Under such objects, according to a preferred embodiment of the present invention, there is disclosed an image reproducing system comprising an image reproducing apparatus for reproducing an image which is recorded onto an image recording medium in accordance with an external control signal and a control unit which has a memory device of a predetermined memory capacity and which controls the image reproducing apparatus, wherein an index image consisting of a predetermined number of recording images on the image recording medium is stored into the memory device of the control unit together with identification information to specify the image recording medium, more preferably, the identification information is also recorded onto the image recording medium.

Further another object of the invention is to provide an image reproducing apparatus to construct the above system.

Still another object of the invention is to provide a memory device to construct the above system.

Still another object of the invention is to provide an image reproducing system having a novel function.

The above and other objects and features of the present invention will become apparent from the following detailed description and the appended claims with reference to the accompanying drawings.

DETAILED DESCRIPTION OF THE PREFERRED EMBODIMENT

An embodiment of the present invention will be described hereinbelow with reference to the drawings.

Figure 1:
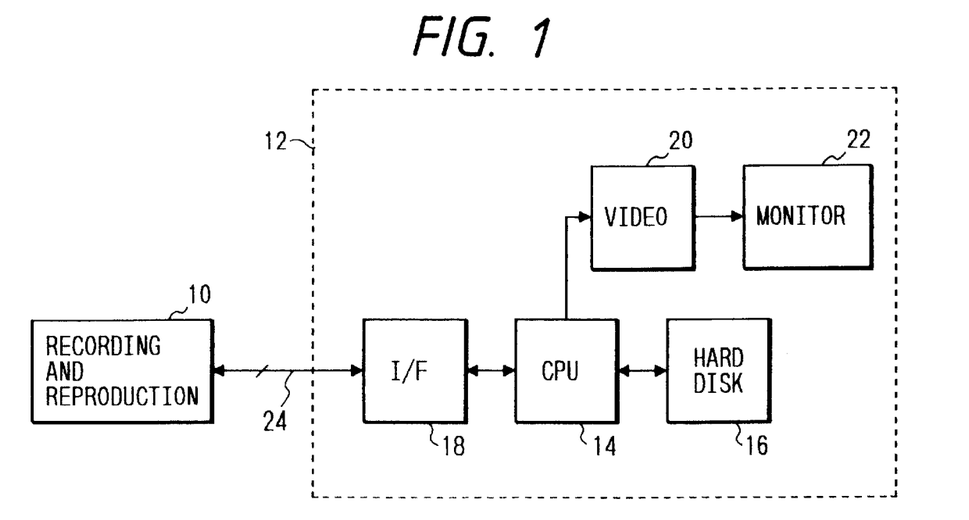
FIG. 1 is a schematic construction block diagram of an embodiment of the present invention.

FIG. 1 is a schematic constructional block diagram of an embodiment according to the invention. Reference numeral 10 denotes a recording and reproduction apparatus in which a still video floppy is used as a recording medium, an input analog video signal is recorded as a still image, the recorded still image is reproduced, and an analog reproduction video signal is generated. Reference numeral 12 denotes a computer for externally controlling the recording and reproduction apparatus 10 and for communicating an image between the computer and the image recording and reproduction apparatus 10.

In the computer 12, reference numeral 14 denotes a CPU; 16 a hard disk of a large capacity which can store a number of image information in a digital manner; 18 an interface to communicate an external control signal to the recording and reproduction apparatus 10 and to communicate image data with the recording and reproduction apparatus 10; and 20 a video circuit to generate a video signal to be displayed on an image monitor to a monitor 22. The interface 18 converts the analog video signal from the image recording and reproduction apparatus 10 into the digital signal and supplies the digital signal to the CPU 14. On the other hand, the interface 18 converts the image data from the CPU 14 into the analog video signal and supplies the analog video signal to the recording and reproduction apparatus 10.

A signal line 24 connecting the recording and reproduction apparatus 10 and the interface 18 of the computer 12 includes: two lines for reproduction signals, namely, one line for a luminance signal and one line for a chromaticity signal; two lines for signals which are recorded by the recording and reproduction apparatus 10, namely, one line for the luminance signal and one line for the chromaticity signal; and one line for a control signal of the recording and reproduction apparatus 10. The invention is not limited to the above signal lines. In the case where the recording and reproduction apparatus 10 has video input and output terminals, it is sufficient to use two input and output lines for the luminance signal and chromaticity signal. In the embodiment, the control signal of the recording and reproduction apparatus 10 is a binary level signal of on/off and is supplied from the computer 12 to the recording and reproduction apparatus 10. The apparatus 10 decodes a command sent from the computer 12 by its transition timing and an on/off duration time. The recording and reproduction apparatus 10 doesn't transmit a signal indicative of the self operating state or the like to the computer 12.

Figure 2:
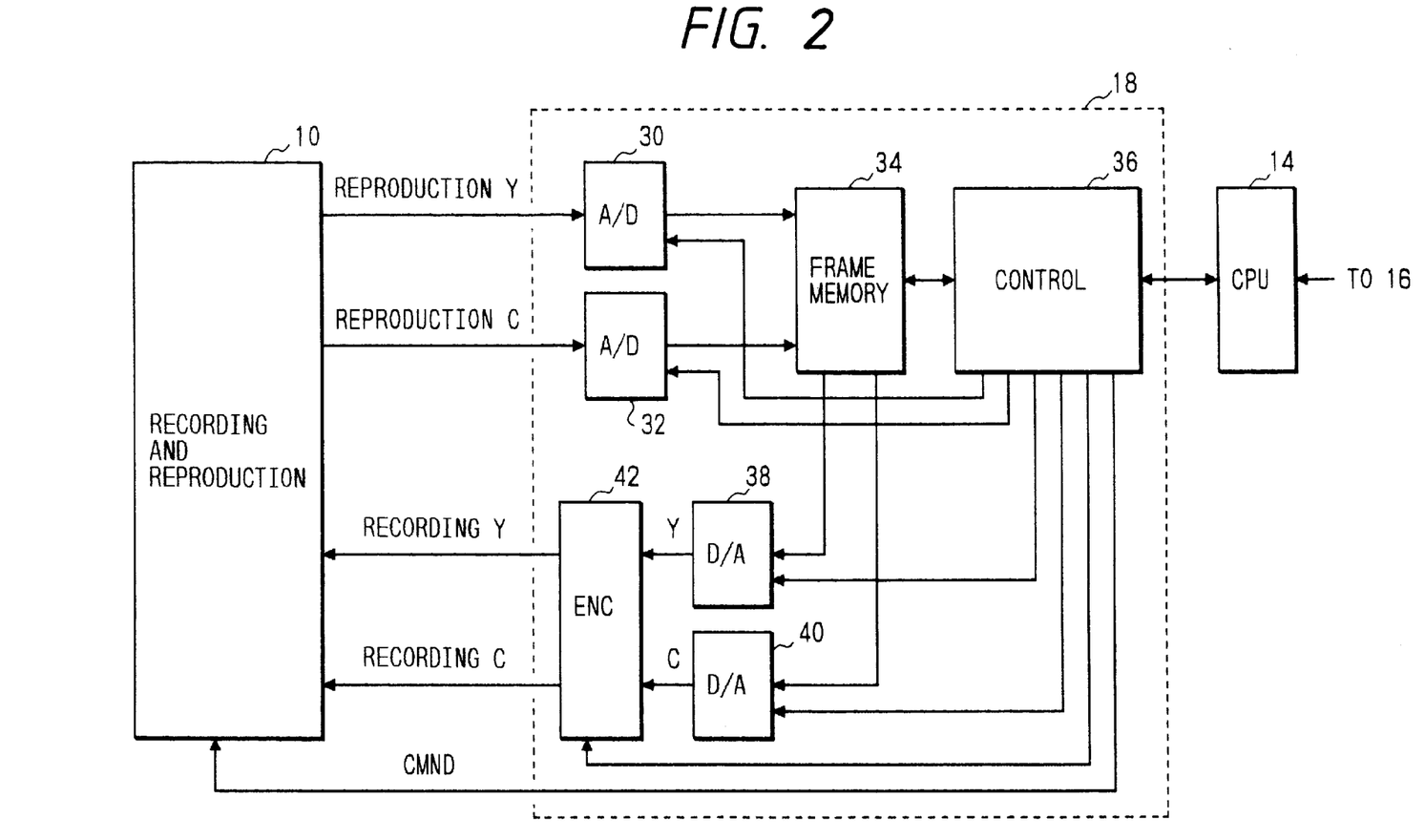
FIG. 2 is an internal circuit diagram of an interface 18.

FIG. 2 shows an internal circuit constructional block diagram of the interface 18. The reproduced luminance signal and the reproduced chromaticity signal from the recording and reproduction apparatus 10 are respectively converted into the digital signals by A/D converters 30 and 32 and are temporarily stored into a frame memory 34. The data written in the frame memory 34 is transferred to the CPU 14 through a control circuit 36. The CPU 14 allows image information from the interface 18 (control circuit 36) to be displayed and monitored by the video circuit 20 as necessary and stores the image information into the hard disk 16. The hard disk 16 has a capacity such that it can record a plurality of sets of index image information supplied through the interface 18.

The control circuit 36 allows the image data from the CPU 14 to be temporarily stored into the frame memory 34. The image information stored in the memory 34 is read out and converted into the analog signal by D/A converters 38 and 40, respectively. A video encoder 42 converts the luminance signal and the chromaticity signal from the D/A converters 38 and 40 into the luminance signal and chromaticity signal of a format adapted to the input format of the recording and reproduction apparatus 10 and supplies to the apparatus 10.

In response to a command from the CPU 14, the control circuit 36 controls the A/D converters 30 and 32, frame memory 34, D/A converters 38 and 40, and video encoder 42.

Figure 3:
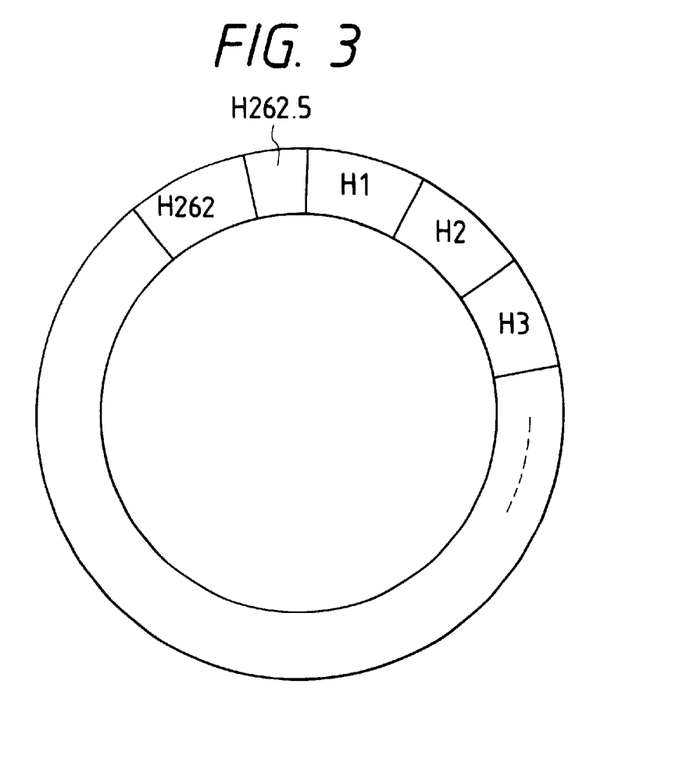
FIG. 3 is a diagram showing the recording content of one track of a still video floppy.

The video signal of one field is recorded onto a recording track of the still video floppy. In case of the NTSC system, as shown in FIG. 3, the video signal of 262.5H (1H denotes one horizontal scan period) is recorded on one circumference. In FIG. 3, $H_1$ denotes the first horizontal line; $H_2$ indicates the second horizontal line; - - - ; and $H_{262.5}$ indicates the next half horizontal line of the 262nd horizontal line $H_{262}$.

As a standard, up to 50 images in case of a field video image can be recorded on the still video floppy and up to 25 images can be recorded in case of a frame video image. There has been proposed a method whereby, as an index, for example, up to 24 images which are recorded onto the tracks of #3 to #26 and #27 to #50 are formed into (5×5) multi-images and they are recorded onto the tracks #1 and #2 (or arbitrary tracks). By recording such an index image (multi-images of 25 images) together onto a medium, a recording image can be easily searched.

Figure 4:
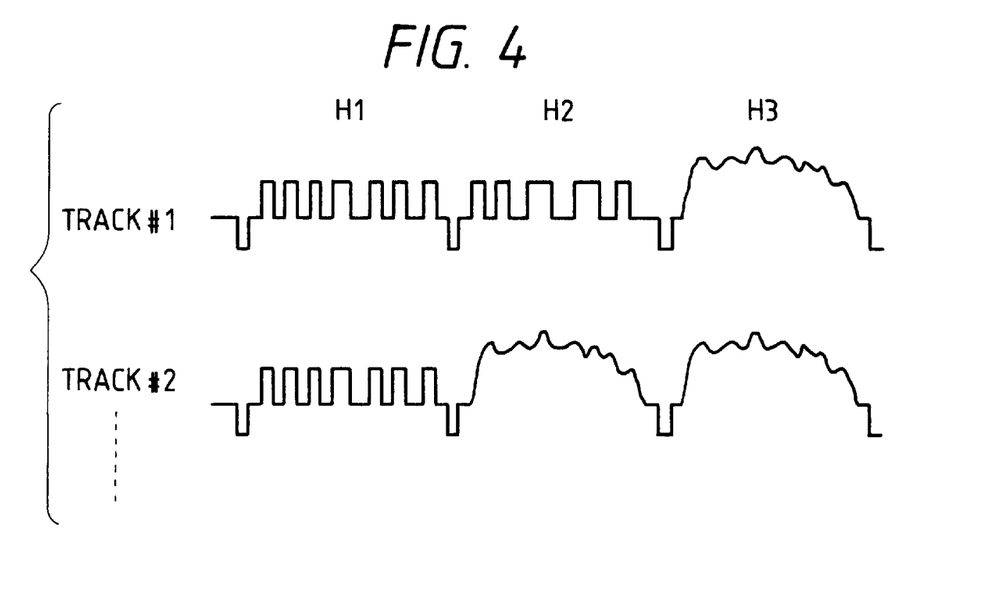
FIG. 4 is a diagram showing examples of signal waveforms on tracks of the still video floppy.

In the embodiment, information (reproducing time or a transition format to the next image) to designate a method of reproducing an image which is recorded onto the track is recorded for the first horizontal line $H_1$ period of each track of the still video floppy. Further, there-is also considered a recording method whereby on the tracks on which the index image has been recorded, an ID code and other data are recorded to the first and second horizontal lines $H_1$ and $H_2$. FIG. 4 shows signal waveforms on the track #1 on which data has been recorded to $H_1$ and $H_2$ and the track #2 on which data has been recorded in $H_1$. In the embodiment, in the case where the image data of the index image has been stored on the hard disk 16, a predetermined ID code is recorded to $H_2$ of the track #1.

The operation of the embodiment will now be described.

Figure 5:
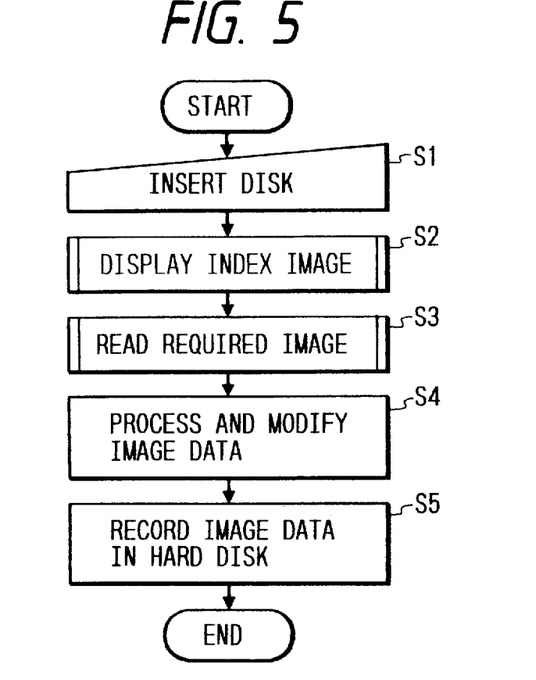
FIG. 5 is a flowchart for an image selecting routine.
Figure 6:
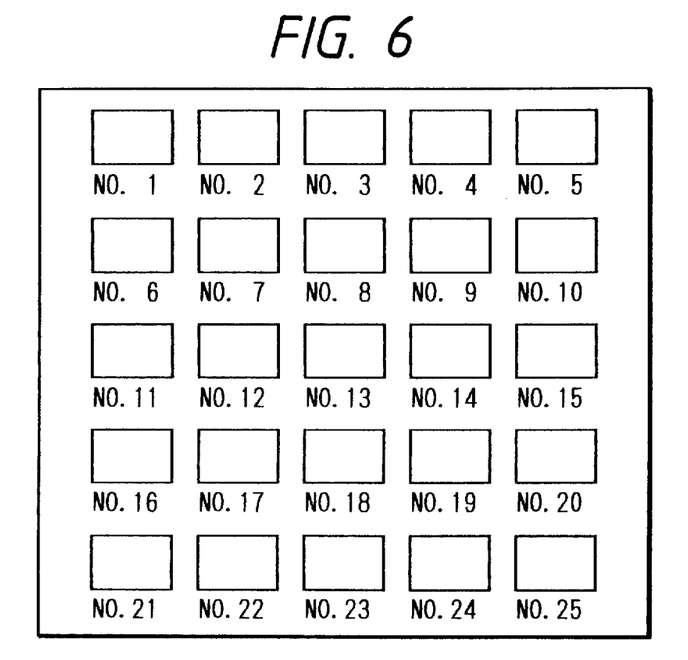
FIG. 6 shows an index image according to a batch display of 25 images.

FIG. 5 shows a flowchart for a routine to select a desired recording image from the still video floppy and to store onto the hard disk 16. When the still video floppy is inserted into the recording and reproduction apparatus 10 (S1), the reproduction is instructed from the computer 12 to the recording and reproduction apparatus 10 and the index image is displayed on the monitor 22 (S2). For example, as shown in FIG. 6, 25 (5×5) images are simultaneously displayed. The index image display routine (S2) will be described in detail hereinbelow.

The required image is designated from the index image and is read into the computer 12 (S3). The read image (for example, 640×480 pixels or 320×240 pixels) is processed and modified by using a mouse and by the keyboard operation and the resultant modified image is stored onto the hard disk 16 (S5).

Figure 7:
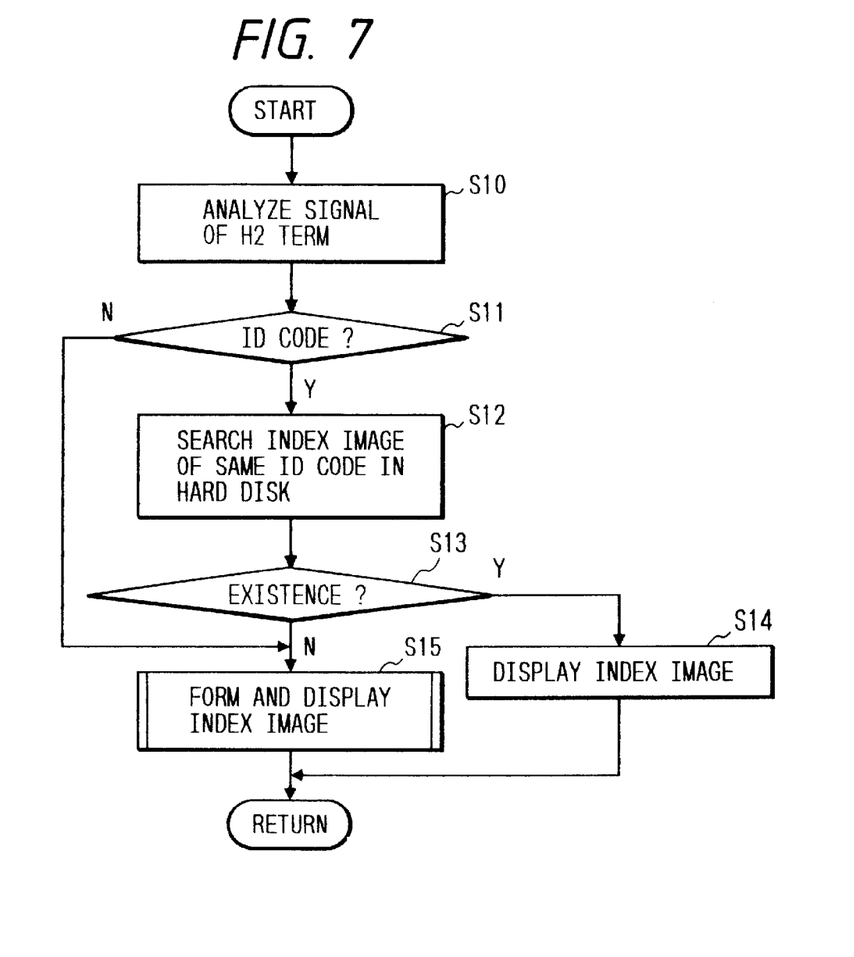
FIG. 7 is a flowchart for an index image display routine.

FIG. 7 shows the details of the index image display routine (S2). First, the reproduction of the track #1 is instructed and the reproduction signal for the $H_2$ term is analyzed (S10). A check is made to see if the ID code has been recorded or not (S11). When the ID code has been recorded (S11), in the hard disk 16, the index image of the same ID code is searched (S12). When such an index image exists (S13), the index image data is read out and displayed on the monitor 22 (S14). If such an index image doesn't exist (S13), an index image is newly formed (S15). Even in the case where NO ID code is-recorded in an $H_2$ term of the track #1 (S11), the index image is newly formed (step S15).

Figure 8:
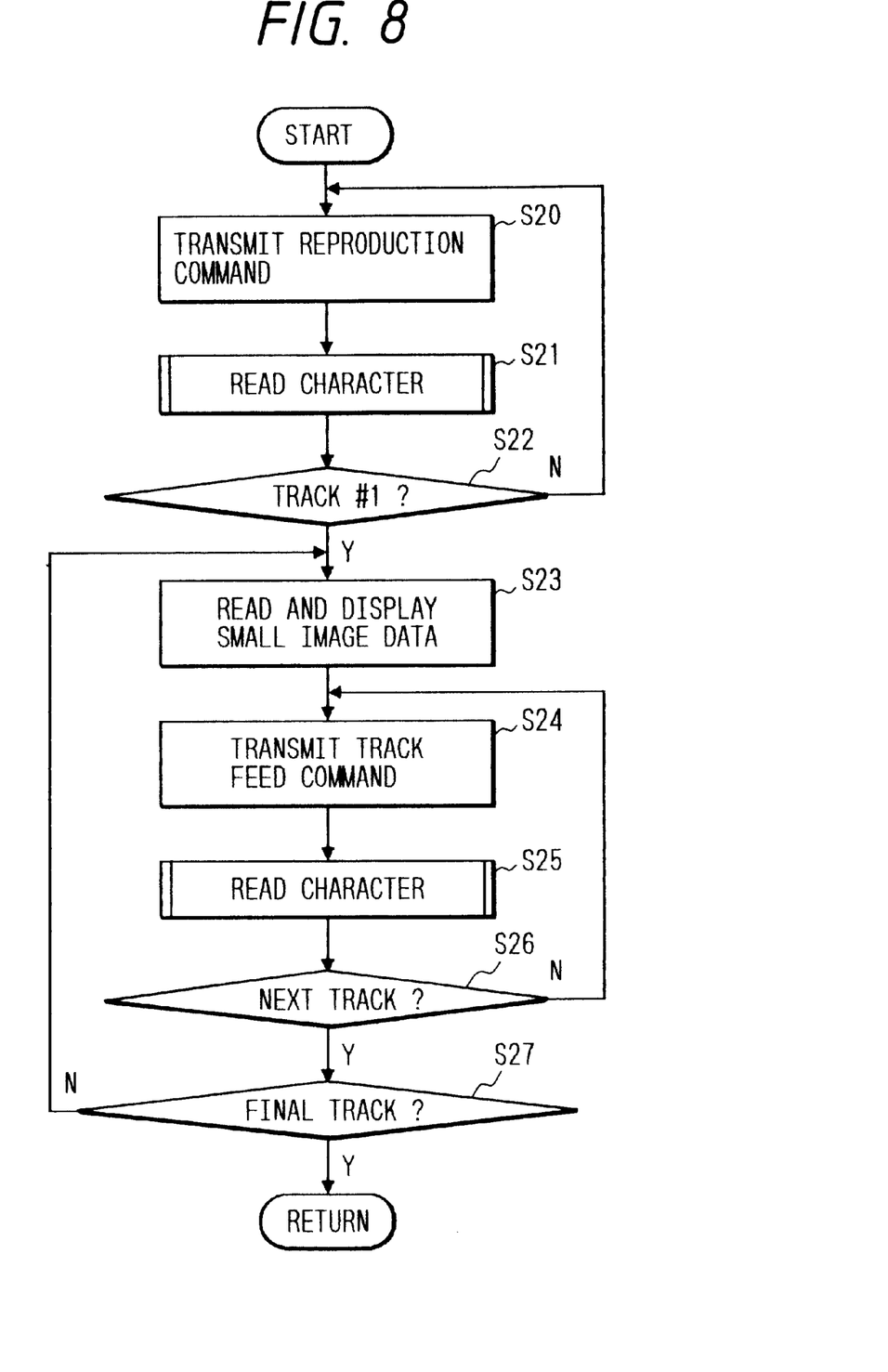
FIG. 8 is a flowchart for an index image forming routine.

FIG. 8 shows the details of the index image forming routine. A reproduction command is sent to the recording and reproduction apparatus 10 (S20). The reproduction track numbers included in the reproduction luminance signal is read (S21). A check is made to see if the information on track #1 is being reproduced or not (S22). A display routine of the reproduction track number included in the luminance signal (S21) will be described in detail hereinbelow. When the track is not the track #1 (S22), for example, a track down command is sent, thereby allowing the reproducing head to face the track #1.

After that, the recording images of the track #1 and subsequent tracks are sequentially reproduced and are read and displayed to 25 small picture planes displayed on the screen (S23 to S27). That is, the recorded image of the first track is reproduced and is reduced into a small image and stored and displayed at a position of No. 1 in FIG. 6 (S23). A track feed command is transmitted in order to reproduce the recorded image of the next track (S24). The reproduced track number indication included in the reproduced luminance signal from such a track is read (S25). A check is made to see if the tracking feeding operation has correctly been performed or not. Until the track correctly reaches the next track (step S26), the track feeding operation and the reading operation of the reproduction track number are repeated (S24, S25).

When it is decided according to the result of the reading operation of the track number that the track feeding operation is correctly performed (S26), the flow is branched off from step S26 to S27, a check is made to see if the track has reached the final track (namely, the 25th track) of the index image display or not (S27). The processes in steps S23 to S26 are repeated until the final track. Due to this, the index image data is formed and sent to the computer 12.

The method of forming the index image data is not limited to the above method. For instance, in case of using a medium on which the index image has previously been recorded, only the index image can be also reproduced from such a medium.

Figure 9:
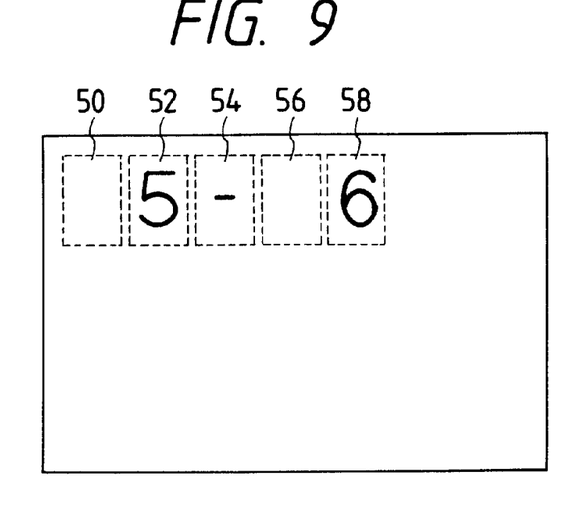
FIG. 9 is a diagram showing an example of a reproduced image in which the reproduction track number has been multiplexed and displayed.

The reproduction track numbers have been multiplexed onto the reproduction video signal that is outputted from the recording and reproduction apparatus 10 by a format as shown in FIG. 9. The reproduction track numbers are displayed in areas 50 and 52 and areas 56 and 58. In case of the frame reproduction, "-" is displayed in an area 54. In case of the field reproduction, the reproduction track numbers are displayed in only the areas 50 and 52. In case of the frame reproduction, the track numbers of the frame recording are displayed in the areas (50 and 52) or (56 and 58) and "-" is displayed in the area 54.

Figure 10A:
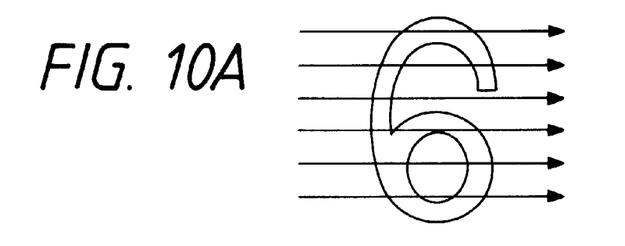
FIGS. 10A and 10B are explanatory diagrams of a method for reading the reproduction track number.
Figure 10B:
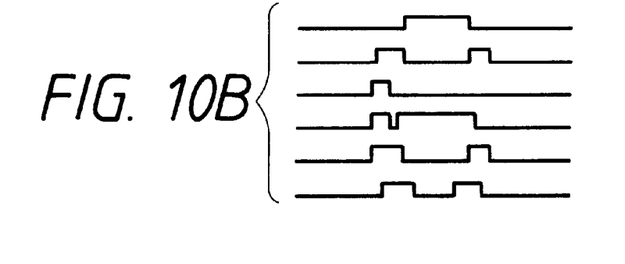

The display positions or timings of the areas 50 to 58 and the font patterns of respective characters have been predetermined. Therefore, in the computer 12, the display contents can be analyzed from the video signals in the areas 50 to 58. For instance, as shown in FIGS. 10A and 10B, as for the numeral "6", the scan lines change as shown in FIG. 10B, so that it is possible to know that the numeral "6" is displayed from such a state of change.

Figure 11:
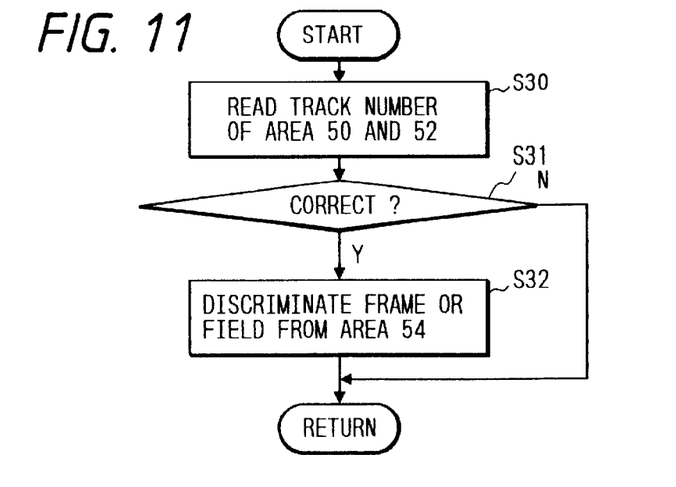
FIG. 11 is a flowchart for a reading routine of the reproduction track number.

FIG. 11 shows a flowchart to read characters. First, the track numbers which are displayed in the areas 50 and 52 are read (S30). A check is made to see if they are correct as track numbers or not (S31). That is, a check is made to see if the track number is expressed by Arabic numeral and is a number within a predetermined range or not. If they are correct (S31), the area 54 is read and a check is made to see if the image in the area 54 is the frame image or the field image (S32).

Figure 12:
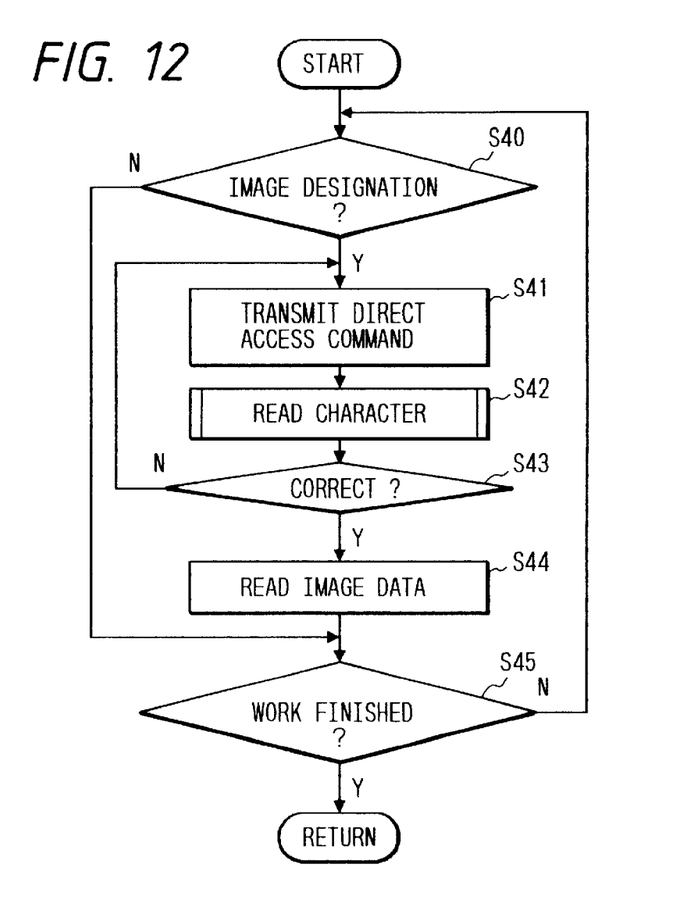
FIG. 12 is a flowchart for a routine to read the designated image into a hard disk 16.

FIG. 12 shows a detailed flowchart of the image reading routine (S3) in FIG. 5. When an image is designated by the operator (S40), the computer 12 instructs the recording and reproduction apparatus 10 to reproduce the track on which the designated image has been recorded, by a direct access command (S41). As described in FIG. 11, the reproduction track number is read from the reproduction video signal from the recording and reproduction apparatus 10 (S42).

The processes in steps S41 and S42 are repeated until the designated track is reproduced (S43). When the designated track is reproduced, the image data is read and stored on the hard disk 16 as necessary (S44).

The processes in steps S40 to S44 are repeated until the end of work is instructed (S45).

Figure 13:
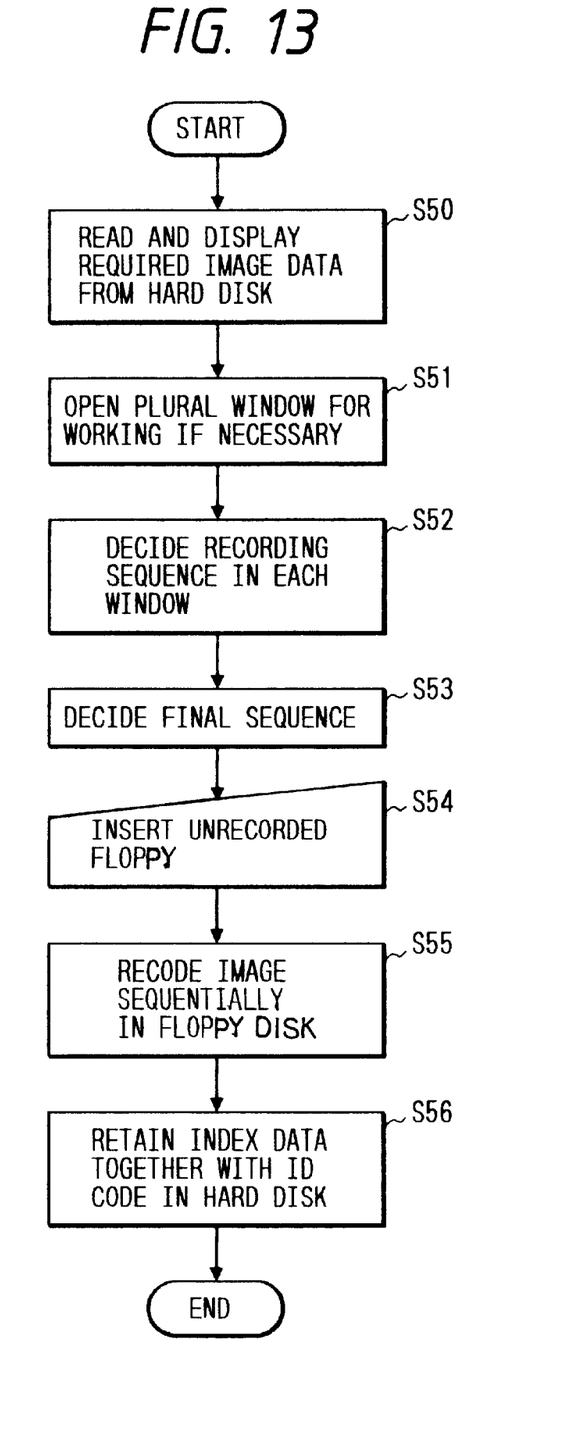
FIG. 13 is a flowchart for a presentation sequence registering routine.

By the above processes, one or more number of desired image data are stored on the hard disk 16. A registering procedure of a sequence to sequentially reproduce such stored images for the purpose of the presentation like, for example, a slide projection will now be described. FIG. 13 shows a flowchart for such a registering procedure.

Figure 14:
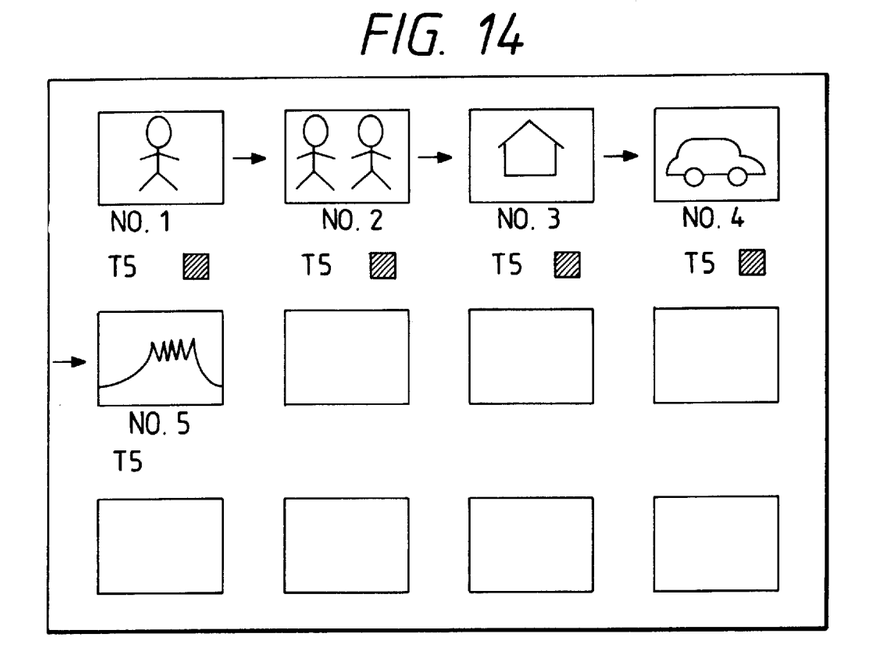
FIG. 14 is a diagram showing an example of the display image in FIG. 13.

Necessary image information is first read out from the hard disk 16 and is displayed on the monitor 22 by a reduced image (S50). FIG. 14 shows an example of the display image on the monitor 22. The display time and a transition mark to designate a transition format to the next image are added below each reduced image. The display time is displayed by arranging numerical values of the display time (seconds) after "T". The transition format includes an immediate switching method, a method of fade in the next image while fading out the preceding image, a method of interposing a random pattern at an intermediate position, a method of laterally scrolling, a method of vertically scrolling, or the like. A mark ("■" indicative of the immediate switching in FIG. 14) to specify one of those methods is displayed subsequent to the display time. At an early time, the display time and the transition format are set to default values.

Another window for working of the sequence registration is opened so as to enable a plurality of sequences to be compared and examined (S51). It is desirable to use a multi-window system which is used in the computer in recent years.

Figure 15:
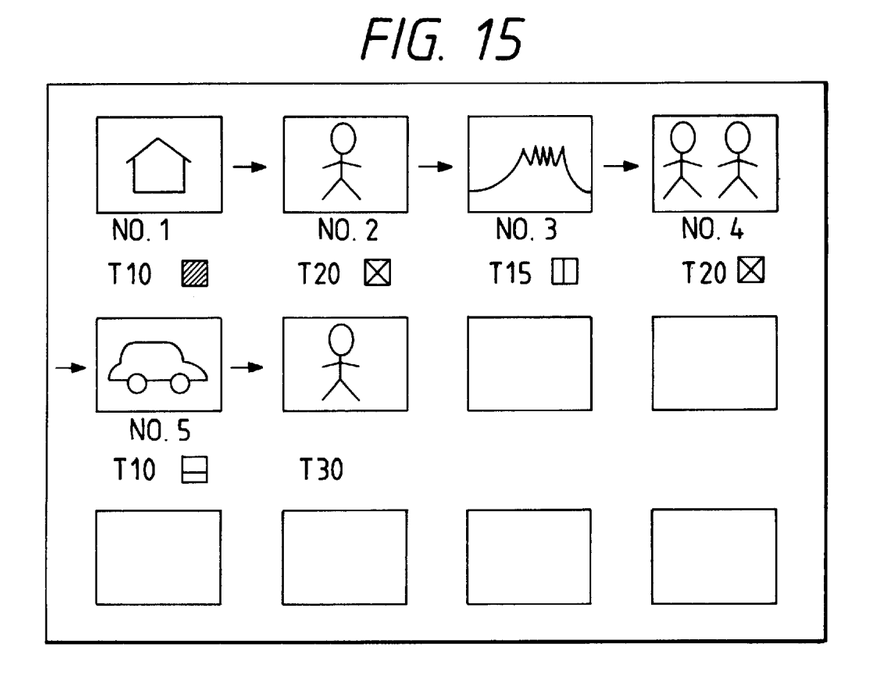
FIG. 15 is a diagram showing another example of the display image in FIG. 13.

By using a mouse or the like, the display order is exchanged, the same image is displayed at another timing, and the transition format and display time are changed. For example, as for FIG. 14, the sequence is modified as shown in FIG. 15.

When the sequence is specified in each window (S52), the sequence which is used is determined (S53). The determined sequence is recorded on the hard disk 16.

An unrecorded still video floppy is loaded into the recording and reproduction apparatus 10 (S54). The image information which is stored onto the hard disk 16 is sequentially converted into the video signals in accordance with the determined sequence order and the video signals are supplied to the recording and reproduction apparatus 10 and recorded in the still video floppy (S55). In this instance, as shown in FIG. 4, the data regarding the display time and the transition format is recorded for the $H_1$ term of each track. The ID code to specify the determined sequence is recorded for the $H_2$ term of the track #1.

After the floppy-was formed as mentioned above (S55), the index image of the formed floppy and the ID code recorded for the $H_2$ term of the track #1 are recorded on the hard disk 16 (S56).

Figure 16:
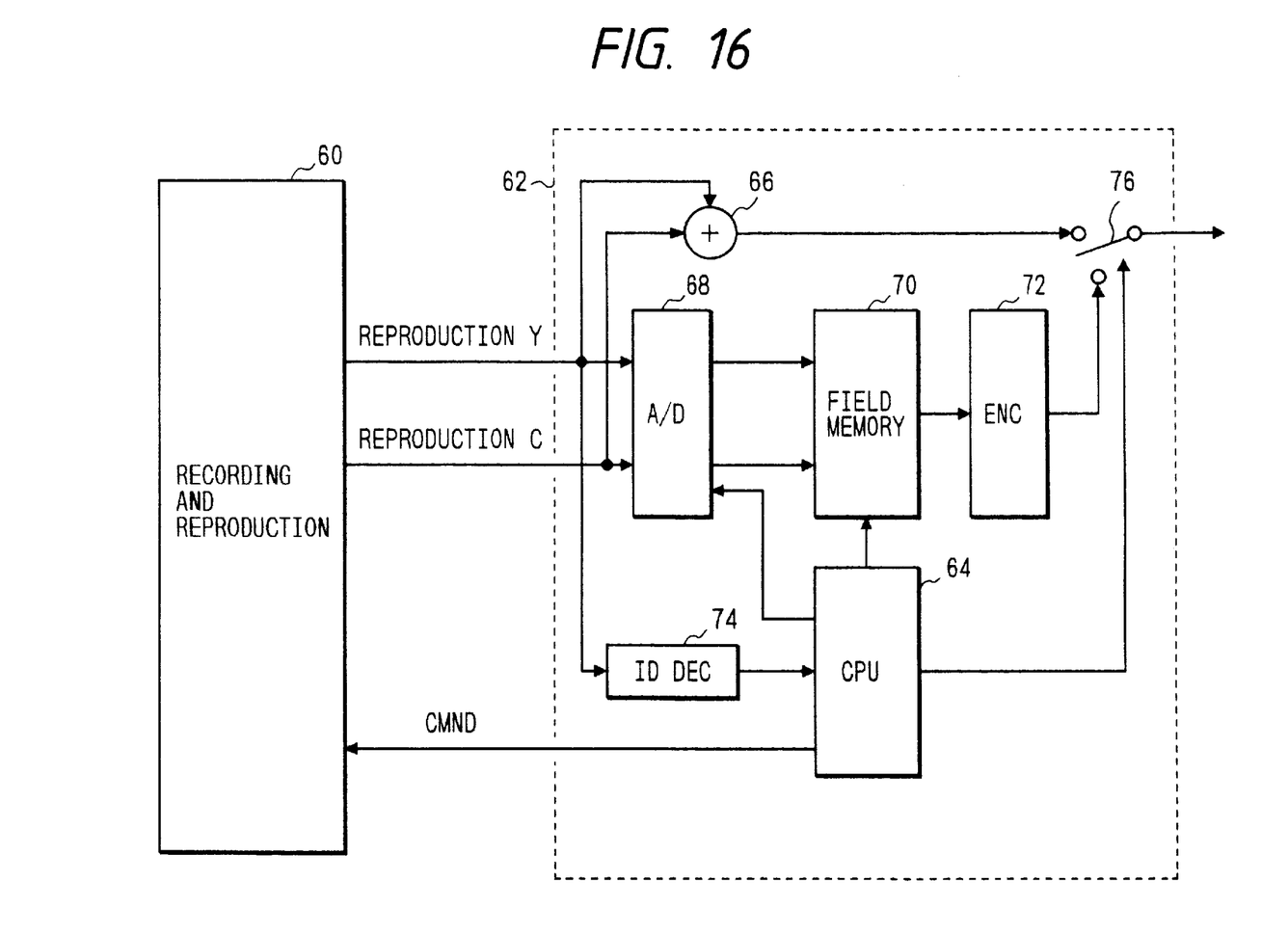
FIG. 16 is a constructional block diagram of a reproduction control circuit of a still video floppy formed for presentation.

FIG. 16 is a constructional block diagram of a reproduction adapter to control the reproduction of the floppy formed by the flowchart shown in FIG. 15. Reference numeral 60 denotes a recording and reproduction apparatus similar to the recording and reproduction apparatus 10 and 62 indicates a reproduction adapter. A CPU 64 of the reproduction adapter 62 transmits a control command to the recording and reproduction apparatus 60 and controls the reproduction and track feeding operation of the recording and reproduction apparatus 60.

The luminance signal and chromaticity signal reproduced from the recording and reproduction apparatus 60 are supplied to an adder 66 and an A/D converter 68. The adder 66 multiplexes the luminance signal and the chromaticity signal and forms a composite signal. The A/D converter 68 converts the analog signal into the digital signal. An output of the A/D converter 68 is once stored into a field memory 70. The field memory 70 functions as delay means. A video encoder 72 converts an output of the field memory 70 into a composite signal of a predetermined format.

The reproduction luminance signal which is supplied from the recording and reproducing apparatus 60 is supplied to an ID decoder 74. The ID decoder 74 decodes the data (display time and transition format) recorded in the $H_1$ term of each track and supplies the decoded information to a CPU 64. The CPU 64 controls the A/D converter 68, field memory 70, and switch 76 in accordance with the information regarding the display time and transition format from the ID decoder 74.

An output of the adder 66 and an output of the video encoder 72 are supplied to the switch 76. The CPU 64 switches the switch 76 in accordance with the information of the display time and transition format from the ID decoder 74. An output signal of the switch 76 is consequently a video signal in which display images are sequentially exchanged by the sequence determined in FIG. 15.

Although the embodiment using the still video floppy as an image recording medium has been described, the invention can be also applied to an optical recording medium such as hard disk, optical disc, magnetooptical disk, or the like, a solid-state memory devices such as D-RAM or flash memory, or the like.

As will be easily understood from the above description, according to the embodiment, since the index image has generally been recorded on the image recording medium or a memory device of the control unit, it is sufficient to display the index image on the monitor. A time which is required to display the index image can be reduced. In the case where the index image doesn't exist in both of the image recording medium and the memory device of the control unit, the recording images on the image recording medium are individually reproduced and the index image is formed and displayed. However, since the formed index image is stored into the memory device of the control unit or the like, it is sufficient to execute the forming process of the index image only once. Accordingly, for instance, in case of using a magnetic medium as an image recording medium, the abrasion of the magnetic head can be reduced.

What is claimed is:

1. An image reproducing system comprising:
   reproducing means for reproducing image information stored on a first recording medium;
   storage control means for causing index information of the image information reproduced by said reproducing means to be stored on a second medium different from the first medium; and
   recording means for recording, on the first medium, information indicating whether the index information is recorded on the second medium, after said storage control means causes the index information to be stored on the second medium.

2. A system according to claim 1, wherein an identify code is recorded on the first medium and wherein said storage control means causes the index information to be stored by correlating to the identify code.

3. A system according to claim 2, further comprising:
   reproducing means for reproducing the identify code recorded on the first medium together with the image information.

4. A system according to claim 3, further comprising:
   means for searching index image information corresponding to the identify code reproduced by said reproducing means.

5. A system according to claim 1, further comprising:
   reproducing means for reproducing one index image information selected from a plurality of index image information stored on the second medium by said storage control means.

6. A system according to claim 1, wherein the first medium is a still video floppy.

7. A system according to claim 1, wherein said reproducing means includes pickup means for reproducing image information from the first medium.

8. A system according to claim 1, further comprising:
   means for generating the index image information from the image information reproduced by said reproducing means.

9. A system according to claim 1, wherein the index information comprises index image information corresponding to the image information recorded on the first medium.

10. An image reproducing method comprising the steps of:
    reproducing image information stored on a first recording medium;
    causing index information of the image information reproduced in said reproducing step to be stored on a second medium different from the first medium; and
    recording, on the first medium, information indicating whether the index information is recorded on the second medium, after the index information is stored on the second medium.

11. A method according to claim 10, wherein an identify code is recorded on the first medium and wherein said causing step causes the index information to be stored by correlating to the identify code.

12. A method according to claim 11, further comprising the step of reproducing the identify code recorded on the first medium together with the image information.

13. A method according to claim 12, further comprising the step of searching index image information corresponding to the identify code reproduced in said identify-code reproducing step.

14. A method according to claim 10, further comprising the step of reproducing one index image information selected from a plurality of index image information stored on the second medium in said causing step.

15. A method according to claim 10, wherein the first medium is a still video floppy.

16. A method according to claim 10, further comprising the step of generating the index image information from the image information reproduced in said reproducing step.

17. A method according to claim 10, wherein the index information comprises index image information corresponding to the image information recorded on the first medium.

* * * * *

UNITED STATES PATENT AND TRADEMARK OFFICE
CERTIFICATE OF CORRECTION

PATENT NO.    : 6,415,097 B1
DATED         : July 2, 2002
INVENTOR(S)   : Takei et al.

It is certified that error appears in the above-identified patent and that said Letters Patent is hereby corrected as shown below:

<u>Title page,</u>
Item [56], FOREIGN PATENT DOCUMENTS,
"60172892" should read -- 60-172892 --.
"0444687" should read -- 4-44687 --.

<u>Column 1,</u>
Line 23, "magnetooptical" should read -- magnetic-optical --.

<u>Column 2,</u>
Line 10, "of a" should read -- of --; and
Line 11, "of" should read -- to --.

<u>Column 4,</u>
Line 40, "there-is" should read -- there is --.

<u>Column 5,</u>
Line 11, "is-recorded" should read -- is recorded --.

<u>Column 7,</u>
Line 8, "floppy-was" should read -- floppy is --; and
Line 50, "magnetooptical" should read -- magneto-optical --, and "a" should be deleted.

Signed and Sealed this

Twenty-second Day of April, 2003

JAMES E. ROGAN
*Director of the United States Patent and Trademark Office*